Jan. 28, 1930.  R. J. BRITTAIN, JR  1,745,320
JOURNAL BOX AND SIDE FRAME SUPPORT
Filed March 21, 1928   2 Sheets-Sheet 1

INVENTOR:
RICHARD J. BRITTAIN, JR.,
BY
HIS ATTORNEY.

Patented Jan. 28, 1930

1,745,320

UNITED STATES PATENT OFFICE

RICHARD J. BRITTAIN, JR., OF NEWARK, NEW JERSEY, ASSIGNOR TO GENERAL MOTORS CORPORATION, OF DETROIT, MICHIGAN, A CORPORATION OF DELAWARE

JOURNAL BOX AND SIDE-FRAME SUPPORT

Application filed March 21, 1928. Serial No. 263,300.

This invention relates to journal boxes and side frame supports and comprises all the features of novelty herein disclosed. An object of the invention is to provide improved devices for yieldingly supporting a side frame on an axle box. Another object is to provide an improved saddle for allowing a journal box to freely adjust itself with respect to a frame to avoid cramping of the axle bearings. To these ends and to improve generally and in detail upon devices of this character, the invention also consists in the various matters hereinafter described and claimed.

The invention, in its broader aspects, is not necessarily limited to the specific construction selected for illustrative purposes in the accompanying drawings in which Fig. 1 is a vertical, longitudinal section of an axle box and associated parts.

Figure 1:
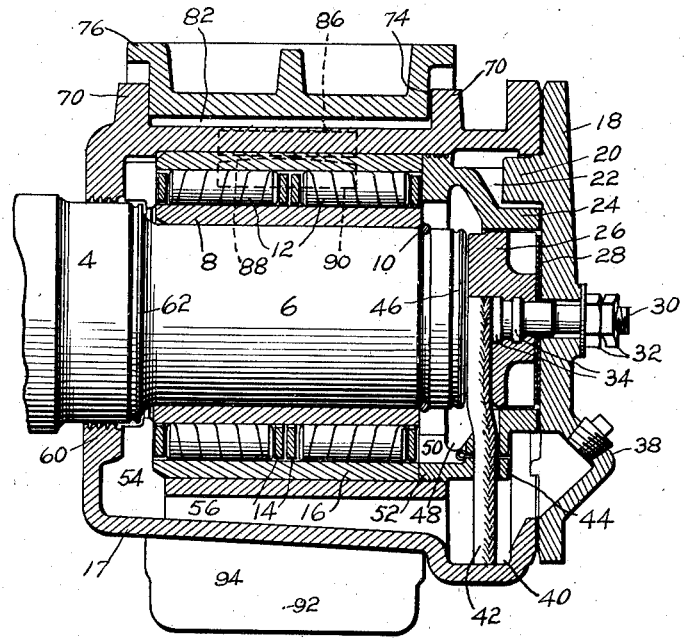
Figure 2:
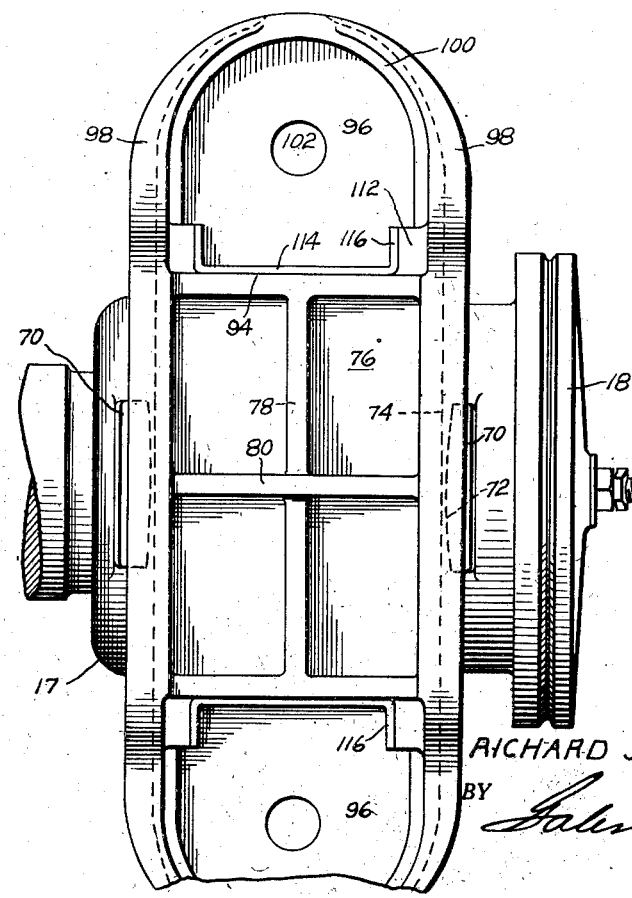
Fig. 2 is a plan view.
Figure 3:
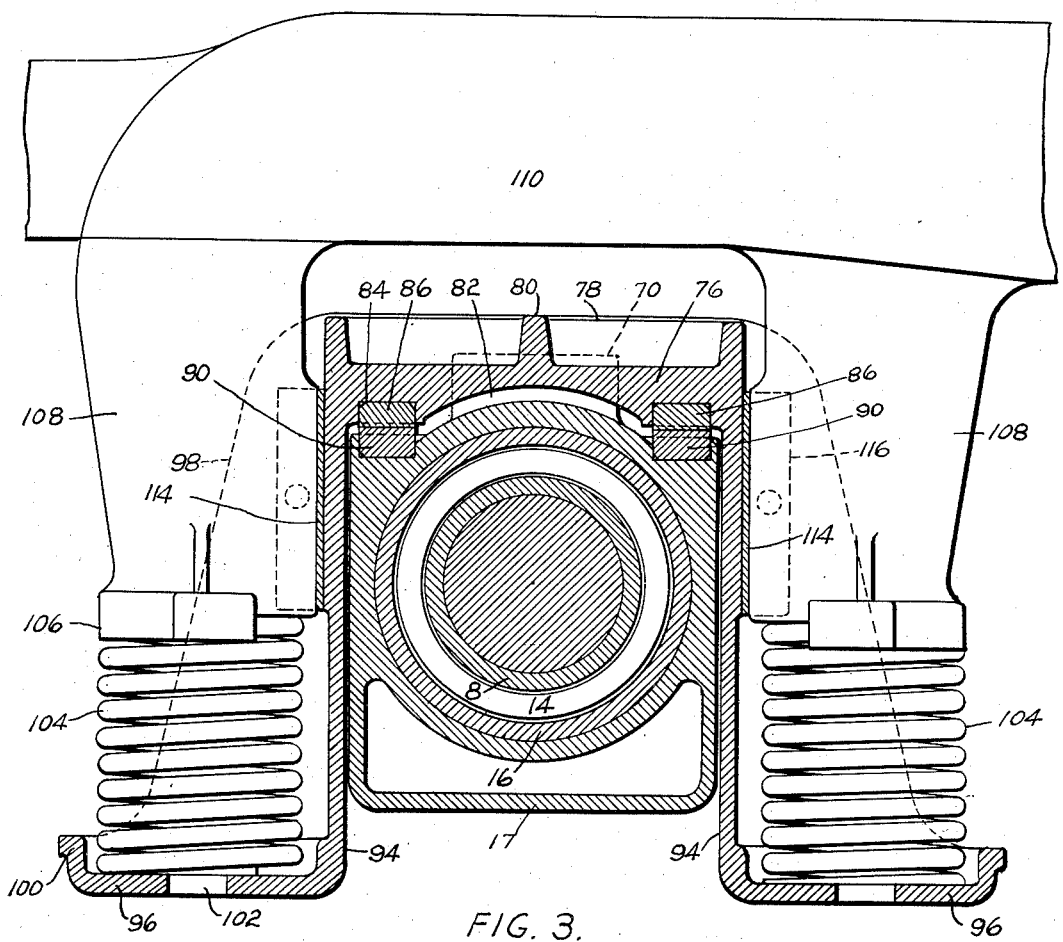
Fig. 3 is a vertical transverse section with portions of a car frame indicated in side elevation.

The numeral 4 indicates a shaft or axle having a reduced portion 6 receiving a sleeve 8 which is shrunk or pressed on the axle and held by a split ring 10. Roller bearings 12 having end rings 14 are interposed between the sleeve 8 and a lining 16 which is inserted in the bore of an axle box or casing 17. An end cap 18 is bolted to the box and has a lug 20 entering a slot 22 in a retainment ring 24 to hold the ring from turning. The retainment ring has a square opening to receive a square thrust block 26 and spacing plates 28 which are clamped to the end cap by a threaded stud 30 and nuts 32. The thrust block is of brass and is cast around square collars 34 of the stud 30 to hold the stud from turning. Lubricant is admitted through a boss 38 of the end cap to a reservoir 40 in the box from which point the lubricant is lifted by a wick 42 to the thrust faces afforded by the end face of the axle and the adjacent face of the thrust block. The wick extends through a boss 44 of the retainment ring and enters a notch in the thrust block where it rubs against the axle to deliver oil thereto. The oil collects on a rib 46 of the axle and is thrown off into an annular groove 48 of the retainment ring, the oil then draining through a notch 50 to the bearings. A flange 52 on the retainment ring has grease grooves making a close joint with the box so that the oil is compelled to traverse the bearings before returning to the reservoir through a recess 54 and inclined drain passage or core 56. The box has a flange 60 with grease grooves making a close joint with the axle 4. Oil that may creep along the axle towards the flange is arrested by a rib 62 on the axle and thrown into the recess 54.

The top of the box is provided with a pair of spaced cross lugs or guiding ledges 70 having their inner faces 72 slightly crowned and receiving loosely between them flat side flanges 74 on a rocking saddle or casting 76. The saddle or casting is braced by webs 78 and 80 and arches over the central portion of the axle box as indicated at 82. The saddle has a pair of rectangular recesses 84 on its under face to receive flat seat plates or blocks 86 which rest on the crowned or arched upper faces 88 of seat plates or blocks 90 which are set into recesses in the top of the axle box. The plates or blocks support the saddle and box for relative rocking movement to prevent cramping of the bearings, the crowned face of each plate or block 90 having a center of curvature at some point 92 which is near the lower ends of the vertical side plates 94 of the saddle and near where the load is applied. The vertical side plates embrace the axle box with a slight clearance to allow the saddle and box to have a small amount of relative rocking or twisting around a vertical axis, this action being facilitated by the crowned faces 72 of the cross lugs 70.

The side plates 94 of the saddle have integral horizontal seat portions 96 with inclined bracing webs 98 merging with the rims 100 of the seats. Openings 102 in the seats serve to drain out foreign matter and define the centers of seats for coil springs 104 which are also seated at 106 at the lower ends of pedestals 108 of a side frame 110. Each side plate of the saddle has parallel vertical guide flanges or ribs 112 to which wear plates are attached, the wear plates being of channel form and each comprising a web or body 114 and side legs 116 which loosely embrace and form guiding ways for one of the pedestals 108.

I claim:

1. In a device of the character described, an axle box, a saddle seated on the box for rocking movement longitudinally of the box, the saddle and box having relatively crowned surfaces to provide for relative transverse twisting, the saddle having side plates embracing the box with a clearance to allow said relative twisting, a side frame having pedestals closely embracing the side plates, the side plates having parallel vertical guide flanges embracing the pedestals and forming ways to guide the pedestals vertically, and springs interposed between the ends of the pedestals and the lower ends of the side plates; substantially as described.

2. In a device of the character described, an axle box having cross lugs on its upper surface, a saddle seated on the box between the cross lugs, the sides of the saddle and the cross lugs having relatively crowned surfaces extending transversely of the box to provide for relative twisting of the box and saddle, the saddle having side plates embracing the box with a clearance to allow said twisting, and a side frame supported by the side plates; substantially as described.

3. In a device of the character described, an axle box having cross lugs with inner crowned surfaces, a saddle seated on the box and having side faces to engage and rock with respect to the crowned surfaces, the saddle having side plates embracing the box, and a side frame supported by the side plates; substantially as described.

4. In a device of the character described, an axle box, a saddle extending over the box and having side plates embracing the box, the top of the box having spaced crowned surfaces near the sides and the bottom of the saddle having flat surfaces supported on the crowned surfaces; substantially as described.

5. In a device of the character described, an axle box, a saddle extending over the box and having side plates embracing the box, the top of the box having spaced recesses near the sides, supporting blocks in the recesses, the bottom of the saddle having spaced recesses, and supporting blocks in the recesses and seated on the first mentioned blocks; substantially as described.

6. In a device of the character described, an axle box, a saddle extending over the box and having side plates embracing the box, supporting surfaces between the box and the saddle and relatively crowned longitudinally of the box, and cross lugs on the box embracing the saddle; substantially as described.

7. In a device of the character described, an axle box, a saddle extending over the box and having side plates embracing the box, the box and the saddle having relatively crowned supporting surfaces to allow rocking movement longitudinally of the box, the box and the saddle also having relatively crowned guide surfaces extending crosswise of the box; substantially as described.

8. In a device of the character described, an axle box, a saddle seated on the box and having side plates embracing the sides of the box with a clearance to allow twisting of the box transversely, the side plates having seats for springs and parallel guiding ways for pedestals, a side frame having pedestals fitting in the guiding ways to maintain the saddle and side frame in substantial alignment, and springs between the ends of the pedestals and the spring seats of the saddle; substantially as described.

In testimony whereof I hereunto affix my signature.

RICHARD J. BRITTAIN, Jr.